Jan. 3, 1967 F. L. FOX 3,296,371

VOICE ENCODER

Filed March 18, 1963 4 Sheets-Sheet 1

INVENTOR.

FREDERICK L. FOX

BY Christie, Parker & Hale

ATTORNEYS.

INVENTOR.
FREDERICK L. FOX
BY
Christie, Parker & Hale
ATTORNEYS.

INVENTOR.
FREDERICK L. FOX
BY
Christie, Parker & Hale
ATTORNEYS.

INVENTOR.
FREDERICK L. FOX
BY
Christie, Parker & Hale
ATTORNEYS.

United States Patent Office 3,296,371
Patented Jan. 3, 1967

3,296,371
VOICE ENCODER

Frederick L. Fox, Pasadena, Calif., assignor to Burroughs Corporation, Detroit, Mich., a corporation of Michigan Filed Mar. 18, 1963, Ser. No. 265,776
4 Claims. (Cl. 179—1)

This invention relates to voice encoders and more particularly to improvements in electromechanical systems for translating coded electrical signals into an audible message.

It is desirable to make an inquiry of information in a digital computer and receive a reply message composed of a number of separate characters, each of which represents a part or a component of the reply message. It is also desirable to translate the reply message characters into an audible and intelligible message for operator observation.

A voice encoding system for a digital computer is known wherein signals capable of being transduced into an audible message are magnetically recorded on a magnetic recording surface. Separate tracks are provided, each containing a message component. A read head is provided for each track. Switching circuits are provided for connecting a read head to a speaker and thereby read the message recorded in the corresponding track and transduce it into an audible message. Composing matrices are provided along with a counter which causes the switching circuits to select the read heads in a prefixed sequence in response to a single address from the digital computer and thereby compose an audible reply message.

A disadvantage of the aforementioned prior art voice encoding system is that only a limited number of reply messages may be selected by the digital computer. This limitation is inherent as only those reply messages for which composing matrices are provided may be encoded into an audible message. Also, the composing matrices for selecting the tracks are quite elaborate and expensive.

In contrast to the prior art voice encoding system, the present invention provides a voice encoding system in which a nominal number of message components are prerecorded and used for composing any reply message expected from a digital computer. The prerecorded message components are capable of being read in any desired sequence to compose intelligible and audible messages in accordance with the reply messages from the digital computer without the use of composing matrices. As a result, the number of audible messages that may be composed is increased with a decrease in cost of the system. Also, flexibility in selecting reply messages is increased considerably.

Briefly, a specific embodiment of the present invention comprises a recording means having a plurality of prerecorded message components capable of being read in various sequences and combinations and being transduced into an audible message. A memory means is provided for storing a message represented by coded signals, The coded signals represent a combination of the message components stored in the recording means which, when read and transduced into an audible message, are descriptive of the message. Means is provided for reading the coded signals out of the memory means. Also, means is provided for reading the message components out of the recording means which are specified by the signals read out of the memory means. A speaker means is provided for transducing the message components, in the order read out of the recording means, into a complete audible message for listener observation.

These and other aspects of the present invention may be more fully understood with reference to the following description of the figures, of which:

GENERAL DESCRIPTION

Figure 1:
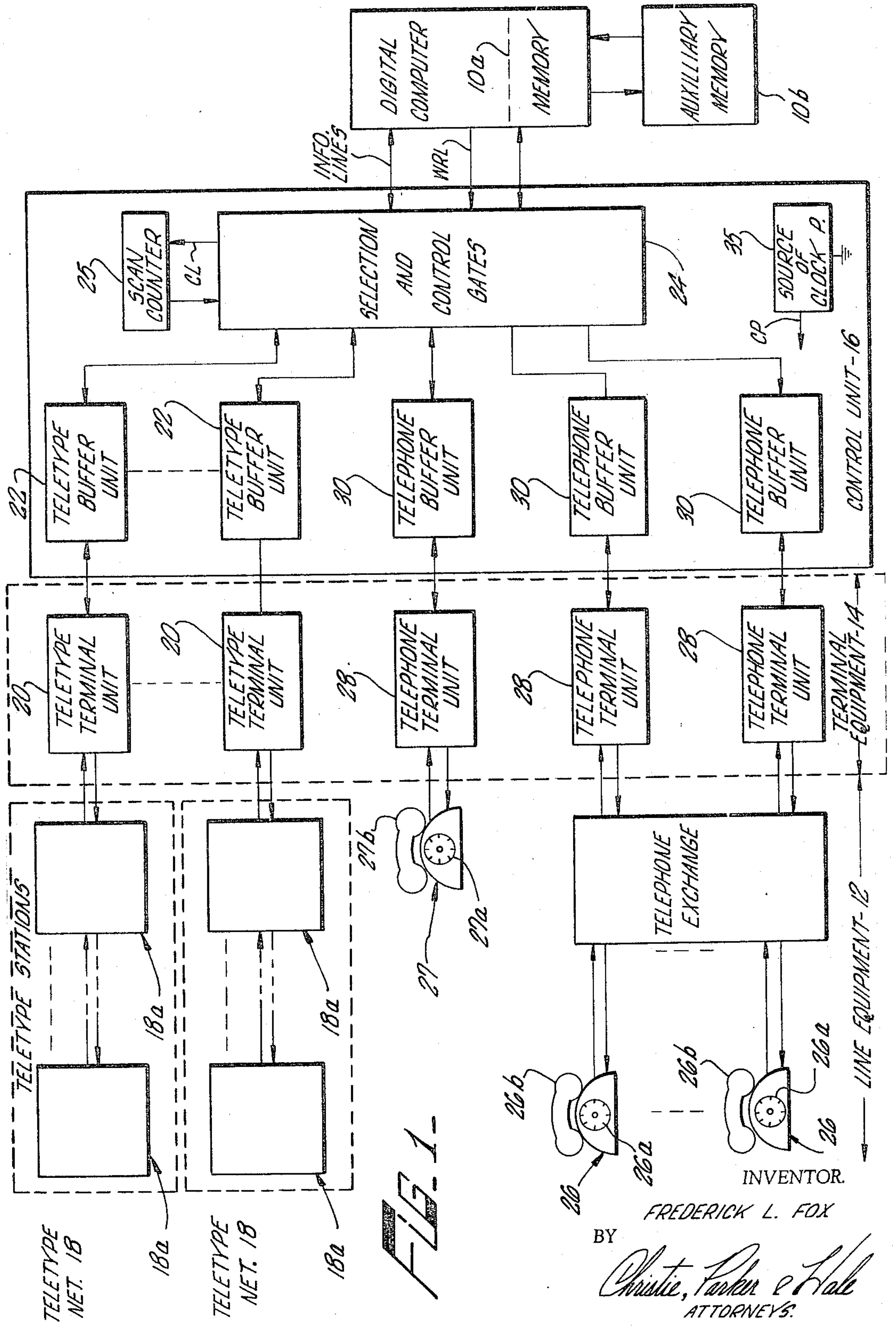
FIG. 1 is a general block diagram of an inquiry system for a digital computer and embodying the present invention.

Refer now to FIG. 1 which shows a general block diagram of an inquiry system for a digital computer and embodies the present invention. A digital computer 10 is arranged for receiving inquiry messages requesting information stored in a memory 10*a* of the digital computer 10 or an auxiliary memory 10*b*. The digital computer is arranged for reading information out of the auxiliary memory 10*b* as needed in accordance with the type of memory device employed. Additionally, the digital computer 10 is arranged for composing a reply message in answer to an inquiry message presented thereto by processing data stored in the memory 10*a* or the auxiliary memory 10*b*. After composing a reply message to the inquiry message, the digital computer 10 is arranged for sending the reply message back to the inquiry equipment.

The digital computer 10 is arranged for receiving inquiry messages arranged in characters and for providing reply messages in characters. The characters of the inquiry and reply messages are characterized in form as serial-by-character, parallel-by-bit.

The inquiry system for presenting inquiry messages to the digital computer 10 and for receiving reply messages to the inquiry messages includes inquiry means, terminal means and buffer means hereinafter referred to as line equipment 12, terminal equipment 14, and a control unit 16, respectively. By way of example, two types of line equipment 12 are shown—Teletype equipment and telephone equipment.

The line equipment 12 contains a plurality of Teletype nets 18. Each Teletype net 18 has a plurality of Teletype stations 18*a* connected in a series net arrangement. Also contained in the line equipment 12 are a plurality of telephone sets 26 and a single telephone set 27, both types of the kind commonly used in telephone systems.

The telephone sets 26 are connected through a telephone exchange (PBX unit) 29 to the terminal equipment 14, whereas the telephone set 27 is connected directly to the terminal equipment 14 without a telephone exchange 29.

Each Teletype net 18 is connected through a separate Teletype terminal unit 20, in the terminal equipment 14, to the control unit 16. Similarly, the telephone exchange 29 is connected through two telephone terminal units 28, to the control unit 16.

Each of the terminal units 20 and 28 are connected to a separate buffer unit contained in the control unit 16. The Teletype terminal units 20 are connected to Teletype buffer units 22, whereas the telephone terminal units 28 are connected to telephone buffer units 30.

The control unit 16 also has selection and control gates 24 along with a control or scan counter 25 for sequentially coupling one of the buffer units 22 and 30 to the digital computer 10.

Each buffer unit 22 and 30 has four different modes of operation. The modes of operation of the buffer units are shown in Table I.

TABLE I

| Modes: | Operation of buffer units **22** and **30** |
|---|---|
| 1 | Buffer input from line equipment. |
| 2 | Buffer output to computer. |
| 3 | Buffer input from computer. |
| 4 | Buffer output to line equipment. |

During mode 1 of the buffer units, an inquiry message is composed at one of the Teletype stations or a telephone set in the line equipment 12. The inquiry message is then sent via a terminal unit to the corresponding buffer unit in the control unit 16 where the inquiry message is temporarily stored. During mode 2, the inquiry message is subsequently read out of temporary storage in the buffer unit in which it is stored and coupled through the selection and control gates to the input of the digital computer 10. The digital computer 10 composes a reply message to the inquiry message. During mode 3, the digital computer 10 sends a reply message back to the same buffer unit from which the inquiry message was received via the selection and control gates 24. The buffer unit temporarily stores the reply message. During mode 4, the reply message is read out of temporary storage in the buffer unit in which it is stored and sent back to the Teletype station or telephone unit where the inquiry message was originated via the associated terminal unit.

This invention is directed to the apparatus whereby a reply message from the digital computer 10 is encoded into an audible phonic message for a person composing an inquiry message at one of the telephone sets. A copending patent application entitled, Inquiry System, bearing Serial Number 265,435 and filed on March 15, 1963, is directed to the over-all inquiry system shown in FIG. 1, and includes the buffer units and associated control of the control unit 16. The present application only asserts claims to the voice encoding portion of the inquiry system disclosed in the above reference copending patent application entitled, Inquiry Systems.

Figure 2:
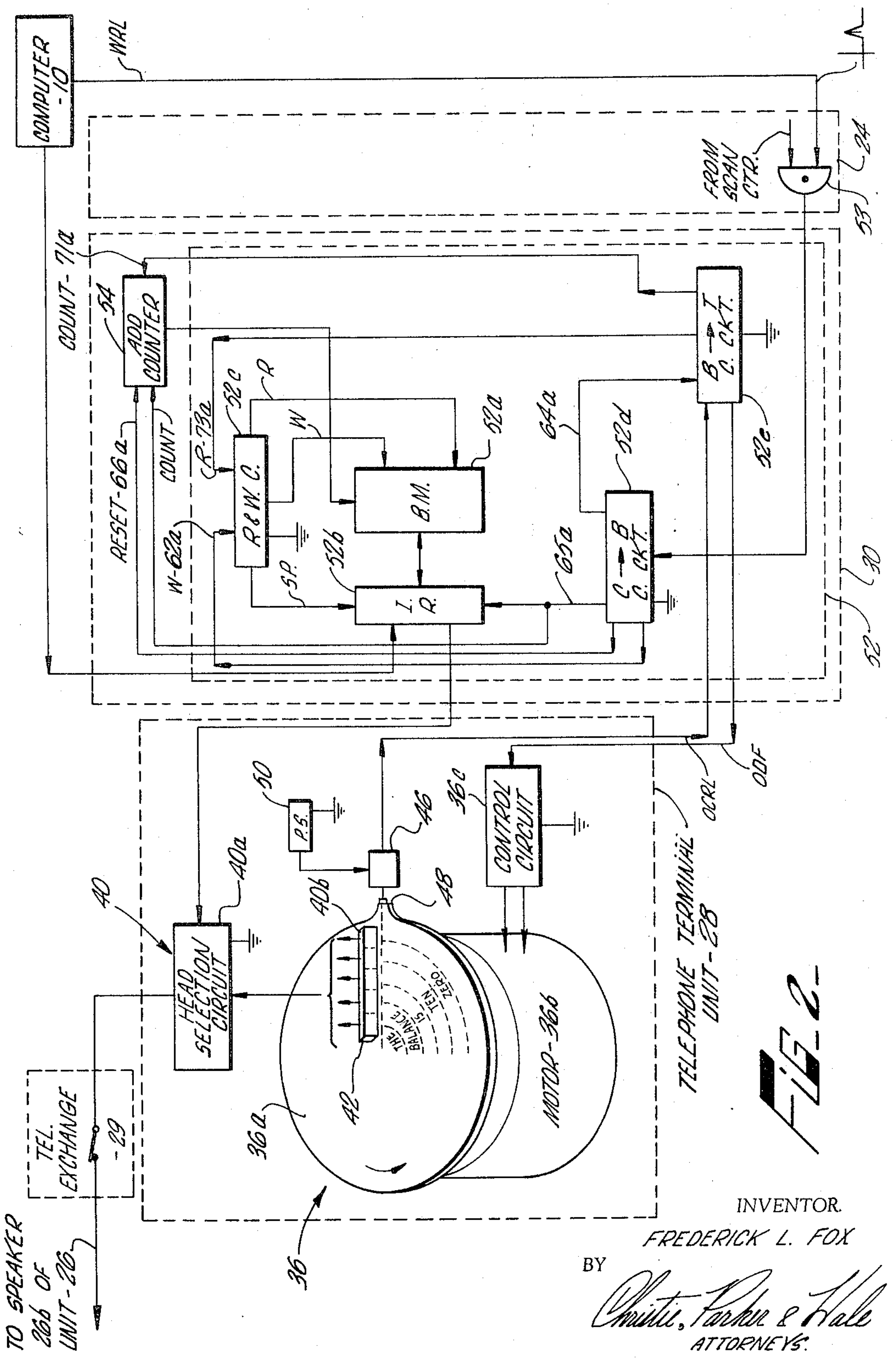
FIG. 2 is partly a pictorial diagram and partly a block diagram of a telephone terminal unit and a telephone buffer unit for the inquiry system of FIG. 1 and embodying the present invention.

Refer now to FIG. 2. At right-hand side of FIG. 2 a block diagram is shown of the portion of the telephone buffer unit 30 for operating during modes 3 and 4, wherein reply messages are received from the digital computer 10 and sent to an inquiry station.

The telephone terminal unit 30 contains a memory means 52 including circuits for reading and writing in the memory means and an address counter 54 for addressing the memory locations into which and out of which characters of digital signals are written and read.

At the left-hand side of FIG. 2 a pictorial and partial block diagram is shown of the voice encoding portion of the telephone terminal unit 28. The telephone terminal unit 28 contains a recording means 36 including a magnetic recording disk **36*a* which is driven by a motor 36*b* under control of a motor control circuit 36*c*. The magnetic recording disk 36*a*** is a flat disk which contains a plurality of recording tracks. A phonic message component is recorded in each recording track. By way of example, FIG. 2 depicts the tracks as dashed lines with the tracks containing the phonic message components "THE," "BALANCE," "IS," "TEN – – – ZERO." The tracks may be selected in such a sequence as to compose a complete reply message, such as "THE BALANCE IS ONE FIVE THREE," as described in more detail hereinbelow.

The telephone terminal unit 28 also contains means 40 for reading the phonic message components recorded in the recording tracks and forming electrical signals corresponding to the phonic message components which are capable of being transduced into an audible sound by the speaker **26*b* of the telephone unit 26. The reading means 40 includes a read head assembly 40*b* containing a read head 42 for each recording track on the recording disk 36*a*. Also included in this reading means 40 is a head selection circuit 40*a***.

The reading heads 42 are conventional magnetic reading heads similar to that used for reading magnetically recorded information from magnetic recording drums. The head selection circuit **40*a* is a conventional electronic switching circuit for connecting the output circuit of one of the read heads 42 to the speaker 26*b* of the telephone unit 26. The head selection circuit 40*a* selects the output of the read head 42 which is reading the phonic message component from the track designated by each character of signals provided by the telephone terminal unit 30. For purposes of explaining the invention, it is assumed in the remainder of the specification that the telephone exchange 29 has a switch closed which is connecting the output of the head selection circuit 40*a* to one of the telephone speakers 26*b*** as illustrated in FIG. 2.

Refer now to the general operation of the portion of the inquiry system of FIG. 2 wherein a reply message is sent from the digital computer 10 to one of the telephone sets 26. As pointed out hereinabove, reply messages are sent to a buffer unit by the digital computer 10 and from the buffer unit to a telephone set during modes 3 and 4 of the buffer unit. While each of the buffer units are in mode 1, the scan counter 25 (FIG. 1) scans each of the buffer units of the control unit 16 until a buffer unit is found which contains a complete inquiry message for the digital computer 10. The scan counter 25 then locks in a state corresponding to the buffer unit containing the complete inquiry message and causes the selection and control gates 24 to couple that buffer unit to the digital computer 10. The scan counter 25 remains in the same state during modes 2, 3 and 4 of the buffer unit. Therefore, during modes 3 and 4 of a buffer unit, the same buffer unit is continuously connected to the digital computer 10.

While the digital computer composes a reply message, the buffer unit 30 is in mode 3. The digital computer 10 forms a control signal at the WRL output circuit thereof whenever a reply message is composed and ready to be sent back to the requesting telephone set. The selection and control gates 24 in turn apply a signal to the corresponding telephone buffer unit 30 and the circuits of the telephone buffer unit 30 are set up ready to receive the reply message. The digital computer 10 then starts presenting the reply message to the control unit 16 character by character beginning with the first character which is to be encoded. The memory means 52 of the telephone buffer unit 30 which is connected to the digital computer 10 stores the reply message character by character in series as presented by the digital computer 10.

After the complete reply message is stored in the memory means 52 of the telephone buffer unit 30, the telephone buffer unit 30 switches into mode 4. During mode 4, reading circuits of the memory means 52 read the characters of the stored reply message out of the memory means and present the characters to the corresponding telephone terminal unit 28 one character at a time beginning with the first character received from the digital computer 10. The telephone terminal unit 28 converts each character into an electrical signal which is transduced by the speaker **26*b*** of the telephone set from which the inquiry message was originally composed into an audible phonic message component for a listener.

Referring to FIG. 2, as each individual character of the reply message is presented to the head selection circuit **40*a*, the motor means 36 is energized and the recording disk 36*a* is rotated. The output of the reading head 42 reading the message component in the track corresponding to the character of signals provided by the memory means 52 is connected to the receiver 26*b* of the telephone set to which the output of the head selection circuit 40*a* is connected. In this manner, a series of six reply message characters representing the message "THE BALANCE IS ONE FIVE THREE" may be encoded into an audible message at the speaker 26***b*. It should also be understood from the above discussion that the message components on the recording disk 30*a* may be combined in any sequence according to the reply message characters from the computer 10.

*Detailed description*

Refer now to the details of the telephone terminal unit 28 shown in FIG. 2. Before explaining the details of the telephone encoding system, it is pointed out that in the inquiry system it is assumed that each telephone reply message contains exactly ten characters. For purposes of explaining the invention, it is assumed that the address counter 54 only has eleven states of operation which are illustrated in the timing diagrams of FIG. 5 and 6 as states 0 through 10. State 0 of the address counter 54 is an extra state provided for the purpose of simplifying the illustration of the invention whereas states 1 through 10 are states which address memory locations 1 through 10 which store the ten characters of the reply message. The motor control circuit 36*c* energizes the motor 36*b* and causes it to rotate whenever a control signal is applied at the ODF output circuit of the telephone buffer unit 30.

The phonic message components recorded in the magnetic recording tracks on the disk 36*a* are each recorded in their respective tracks beginning along a reference line of the disk. This arrangement is provided so that a reference is provided from which each of the phonic message components begins on the recording disk. The recording disk 36*a* is formed with a cam along its outer edge for operating a cam-actuated switch 46. The recording disk 36*a* contains an extended portion 36*d* positioned immediately adjacent the reference line of the recording disk. The cam-actuated switch 46 is positioned adjacent the recording disk 36*a* so that the extended portion 36*d* actuates the switch 46 whenever it rotates to a position adjacent the switch 46. When the extended portion 36*d* actuates the switch 46, a control signal is applied at the OCRL output circuit of the switch. In this manner, a control signal is applied at the OCRL output circuit whenever the disk is rotated with the reference line or the beginning of the message components under the read head assembly 40*b*. The control signal is the output signal from a power supply 50 which is connected to the OCRL line by the switch 46 when it is actuated. When the switch 46 is deactuated, the output signal of the power supply 50 is disconnected from the OCRL output circuit and the control signal is thereby removed.

Refer now to the details of the telephone buffer unit 30 which are shown in FIG. 2. The memory means 52 contains a coincident current magnetic core buffer memory 52*a*, an information register 52*b*, a read and write control circuit 52*c*, and control circuits 52*d* and 52*e*. The buffer memory 52*a* is an addressable memory unit in which digital signals are read and written a character at a time. The information register 52*b* is provided for storing each character which is to be written into the buffer memory 52*a* and for storing each character read out of the buffer memory 52*a* during the time it is used to control the head selection circuit 40*a*.

The C-B control circuit 52*d* is a timing circuit for applying control and count signals to the read and write control circuit 52*e*, the information register 52*b* and to the address counter 54. To be explained in detail, the control circuit 52*d* controls the storing of characters in the information register 52*b* supplied by the computer 10. It also triggers the operation of the read and write circuit 52*c* so as to cause the buffer memory 52*a* to be controlled and write the characters stored in the information register 52*b*.

The B-T control circuit 52*e* is a timing circuit for applying control signals to the input of the control circuit 36*c* causing the motor 36*b* to be energized and for applying write and count signals to the read and write control circuit 52*e* and to the counter 54. A write signal triggers the read and write control circuit 52*c* causing it to control the information register 52*b* and the buffer memory 52*a* and cause a character to be read out of the buffer memory 52*a* and stored in the information register 52*b*.

The address counter 54 is provided for addressing the memory locations of the buffer memory 52*a* and thereby specifying the memory location into which and out of which characters are to be written and read.

For purposes of illustration, the selection and control gates 24 are shown with a single AND gating circuit 53 for controlling the operation of the telephone buffer unit 30 and a direct connection from the output of the computer 10 to the input of the information register 52*b*. This is a simplified representation of circuits of the selection and control gates 24 after the scan counter 25 has selected a buffer unit containing a complete inquiry message. The gating circuit 53 has one input connected to the output of the scan counter 25 and another input connected to the WRL output of the computer 10. It should be understood that in an actual model of the invention and in the above referenced patent application entitled, Inquiry System, the selection and control gates 24 actually contains other timing and control circuits for switching the computer 10 between each of the buffer units corresponding to the state of the scan counter 25 (see FIG. 1).

Referring back to FIG. 1, it will be noted that a source of clock pulses 35 is provided in the control unit 16. The source of clock pulses 35 has an output circuit CP at which clock pulses are applied. The CP output circuit is connected to various circuits of the inquiry system and the digital computer 10 as described hereinbelow for synchronizing the operation of the circuits.

Figure 3:
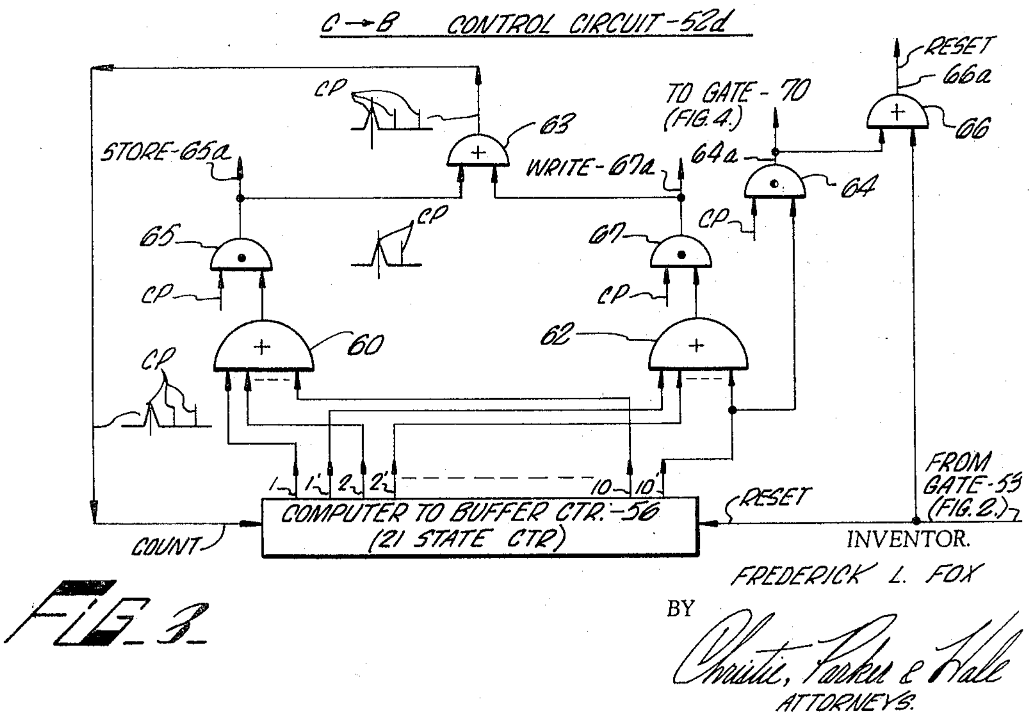
FIG. 3 is a computer to buffer control circuit for the telephone buffer unit of FIG. 2.

Refer now to the details of the C-B control circuit 52*d* which are shown in FIG. 3.

A control counter 56 is provided for controlling the sequence of operation of the buffer 30 while receiving the characters of a reply message from the digital computer 10. The counter 56 has twenty-one states of operation and corresponding to each state an output circuit. The output circuits are referenced by the symbols 1, 1', 2, 2', . . . 10, 10'. When the counter 56 is in its first state of operation, a control signal is applied at the 1 output circuit; when the counter 56 is in its second state, a control signal is applied at the 1' output circuit, etc. The computer counts from its first state up to its last state of operation in sequence, one count each time a control signal is applied at the output circuit of an OR gating circuit 63. When the buffer counter 56 is in the next to the last state of operation (state nineteen), it applies a control pulse at its output circuit 10'. When the counter 56 is in its last state of operation (state twenty-one), it does not apply a control signal at an output circuit. To be explained, the counter 56 counts into its last state and remains in that state as the last reply character is written in the memory means 52*a* until a reset signal is applied to the input, causing it to be reset into the first state of operation. The AND gating circuit 53 provides reset signals to the counter 56 causing it to be reset to its first state of operation, whenever a reply message is ready to be sent from the digtal computer 10 to the memory means 52*a*.

The unprimed output circuits of the counter 56 are connected to the input circuit of an OR gating circuit 60. The primed output circuits of the counter 56 are connected to the input circuit of an OR gating circuit 62.

The output circuits of the gating circuits 60 and 62 are connected to the input circuits of AND gating circuits 65 and 67. The gating circuits 65 and 67 have their output circuits connected to the input circuit of an OR gating circuit 63. The AND gating circuits 65 and 67 each have another input circuit connected to the output circuit CP of the source of clock pulses 35 for providing a pulse output signals at clock pulses.

An AND gating circuit 64 is provided in the C-B control circuit **52*d* for initiating the operation of the B-T control circuit 52*e*. The AND gating circuit 64 has its input circuits connected to the output circuit of the source of clock pulses 35 for causing a pulse output at each clock pulse and the 10′ output of the counter 56**.

Figure 4:
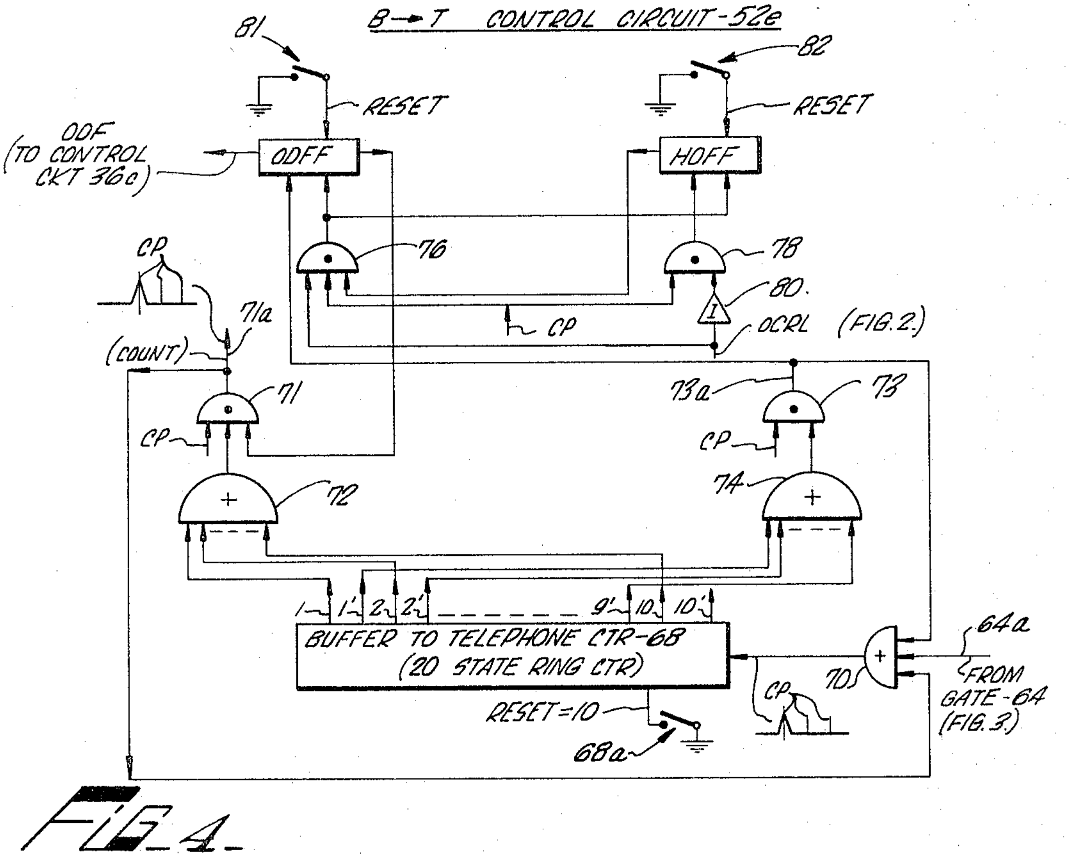
FIG. 4 is a buffer to telephone control circuit for the buffer unit of FIG. 2.

An OR gating circuit 66 is provided for applying a control signal at the input circuit of the address counter 54 (see FIG. 2) whenever the address counter 54 is to be reset into a zero state. The OR gating circuit 66 has its input circuits connected to the output circuits of the AND gating circuits 53 and 64. Refer now to the details of the B-T control circuit **52*e* which are shown in FIG. 4. A ring counter 68 is provided for sequencing the operation of the telephone buffer unit 30 whenever a reply message is transferred out of the buffer unit 30 and encoded into an audible message for a listener at the telephone unit 26. The counter 68 has twenty states of operation and output circuits numbered 1, 1′, etc. similar to the counter 56 of FIG. 3. However, in contrast to the counter 56 of FIG. 3, the counter 68 is a ring-type counter which counts from its last state of operation back to its first state of operation in response to a count signal. The counter 68 receives its count signals from the output of an OR gating circuit 70. Also, the counter 68 has a reset circuit which is connected through a switch 68*a* to ground (zero volts potential). Whenever the switch 68*a* connects the reset circuit to ground, the counter 68 is automatically set into its last state (state twenty) of operation. When in its last state, the next control signal applied to the counter 68** causes it to count back to its initial state (state one) of operation.

The OR gating circuit 70 has its input circuits connected to the output of an AND gating circuit 71, the output circuit **64*a* of the gating circuit 64 (see FIG. 3), and the output circuit of an AND gating circuit 73**.

An OR gating circuit 72 has its input circuits connected to each of the unprimed output circuits of the counter 68. An OR gating circuit 74 has its input circuits connected to each of the primed output circuits of the counter 68 except for the 10′ output circuit.

Control flip-flops ODFF AND HOFF are provided in the B-T control circuit **52*e*. The ODFF flip-flop applies a control signal at an ODF output circuit thereof whenever it is in a true state for energizing the control circuit 36*c*. The ODFF flip-flop has its input circuit for setting it into a true state connected to the output circuit of the OR gating circuit 74. The input circuit of the ODFF flip-flop for resetting it into a false state is connected to the output of an AND gating circuit 76. The AND gating circuit 76 has its input circuits connected to the output circuits OCRL (see FIG. 2), the output circuit CP of the source of clock pulses 35 and an output circuit of the HOFF flip-flop. The output circuit of the HOFF flip-flop connected to the input of the AND gating circuit 76** is the one which receives a control signal when the HOFF flip-flop is in a true state.

The HOFF flip-flop has its input circuit for setting it into a true state connected to the output circuit of an AND gating circuit 78. The AND gating circuit 78 has its input circuits connected to the output circuit CP of the source of clock pulses 35 and the output circuit of a signal inverter circuit 80. The input circuit of the signal inverter circuit 80 is connected to the OCRL output circuit (see FIG. 2). The input circuit of the HOFF flip-flop for resetting the flip-flop into a false state is connected to the output circuit of the AND gating circuit 76.

A reset input circuit of the ODFF and HOFF flip-flops are connected through reset switches 81 and 82 to ground potential (zero volts). Whenever the switches 81 and 82 connect the reset circuits to ground, the corresponding flip-flop is reset into a false state. The switches **68*a*, 81, and 82** are shown for purposes of simplifying the explanation of the invention in illustrating a way in which the corresponding circuits are set into the proper initial condition.

*Detailed description of buffer input from processor operation*

Figure 5:
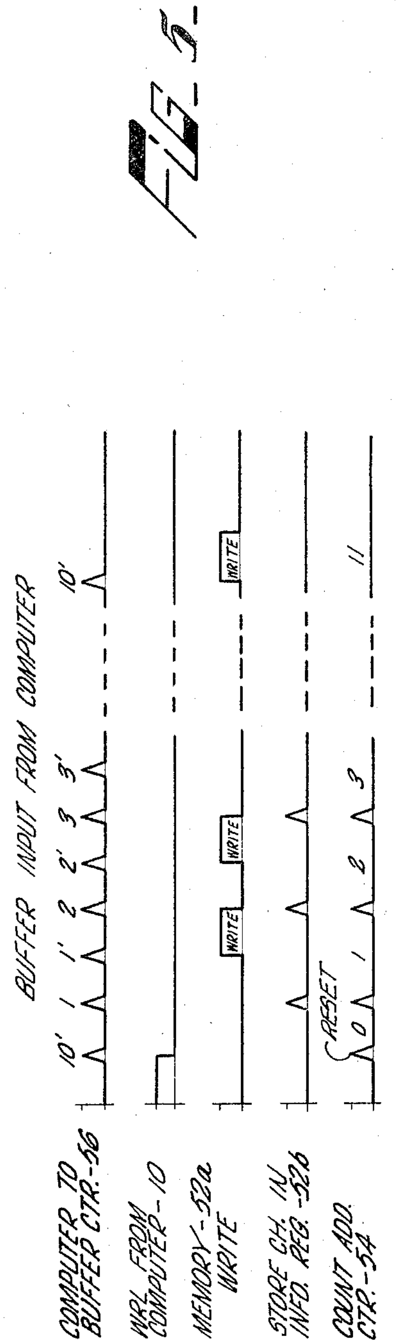
FIG. 5 is a timing diagram illustrating the sequence of operation of the buffer unit of FIG. 2 during the time a reply message is received from the computer.

Refer now to the operation of the telephone buffer unit 30 and assume the digital computer 10 has a reply message which is to be written in the memory means **52*a*. FIG. 5 is a timing diagram illustrating the sequence of operation of the counter 56, the memory means 52*a*, the information register 52*b* and the address counter 54** when receiving a reply message, and a better understanding of the operation may be had with reference to this timing diagram in the following discussion.

Initially, the switches 81, 82 and **68*a* (see FIGS. 3 and 4) are momentarily closed. The flip-flops ODFF and HOFF are reset into false states and the buffer to telephone counter 68 is reset into its last state (state twenty) of operation. Subsequently, the computer 10 automatically applies a control signal at the WRL output circuit. The gating circuit 53 in turn applies a control signal at the following clock pulse to the reset input of the counter 56 and to the input circuit of the OR gating circuit 66. The computer to buffer counter 56 is reset into state one, and the OR gating circuit 66 applies a reset signal to the address counter 54 (see FIG. 2). The address counter 54 is reset into a zero state in response to the reset signal. The counter 56 applies a control signal at the 1 output circuit and at the following clock pulse the gating circuits 63 and 65 apply a control signal to the count input circuit of the address counter 54 and to the input circuit of the information register 52*b* (see FIG. 2). The control signal to the address counter 54 causes it to count into state one. Simultaneously with the control signal, the computer 10 applies a character to the input of the information register 52*b*. The control signal at the input of the information register 52*b* causes the character of signals from the computer 10 to be stored in the information register 52*b***.

The control signal at the output of the gating circuit 63 is also applied to the count input of the counter 56, causing it to step into its second state and apply a control signal at the 1′ output circuit. The control signal at the 1′ output circuit of the counter 56 causes the gating circuits 62 and 67 to apply a control signal at the write input circuit of the read and write control circuit **52*e* (see FIG. 2.) This causes the read and write control circuit 52*e* to apply a read signal to the buffer memory 52*a*, and the character stored in the information register 52*b* is automatically written into address one of the buffer memory 52*a* as addressed by the address counter 54**.

The counter 56 is then set into its third state of operation wherein a control signal is applied at the 2 output circuit. Subsequently, another character from the computer 10 is stored in the information register **52*b* and subsequently stored in the buffer memory 52*a* in a similar manner as described for the first character. When the counter 56 steps into its last state of operation, a complete reply message consisting of ten characters are written in the buffer memory 52*a*. The gating circuit 64 then applies a control signal to the B-T control circuit 52*e* and to the reset input of the address counter 54, indicating that a complete reply message has been written into the buffer memory 52*a* which is now ready to be encoded into an audible message for a listener using a telephone set 26**.

*Buffer output to telephone operation*

Figure 6:
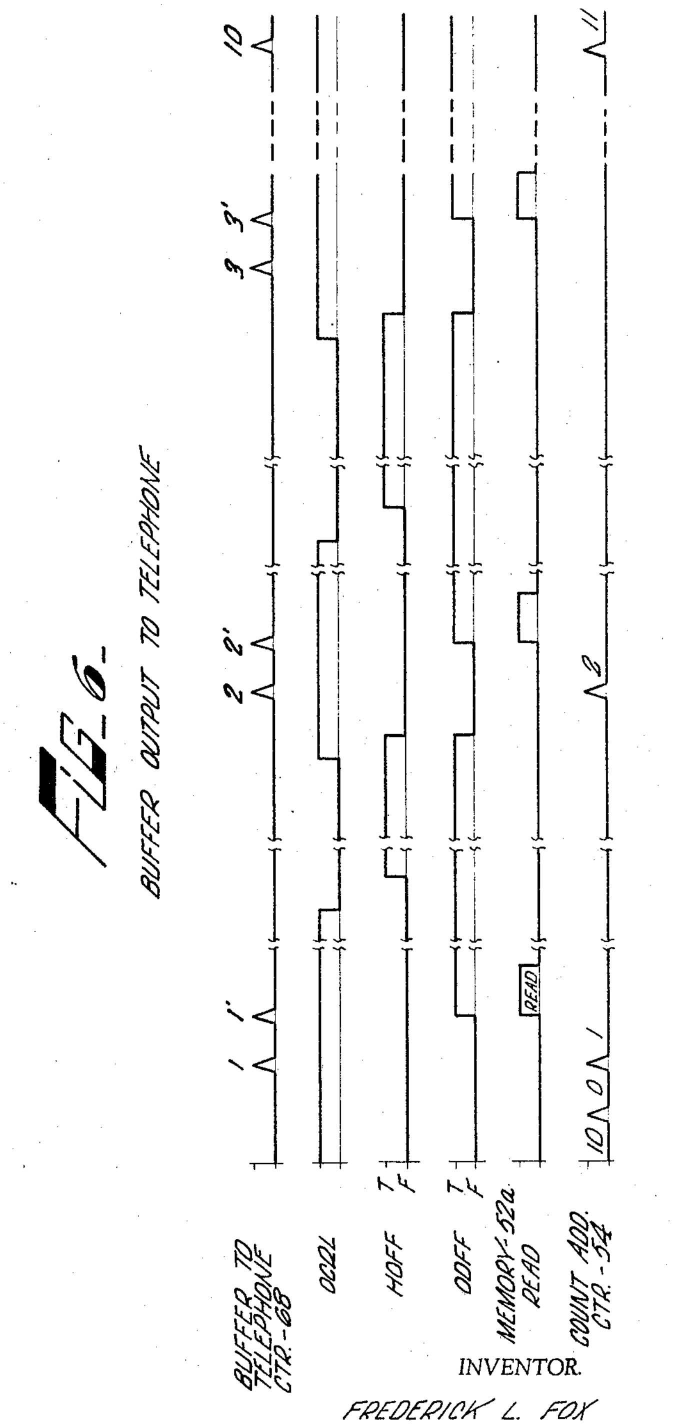
FIG. 6 is a timing diagram illustrating the sequence of operation of the buffer unit of FIG. 2 during the time a reply message is read out of the telephone buffer unit of FIG. 2 and encoded into an audible reply message.

Refer now to FIGS. 4 and 6. FIG. 6 is a timing diagram illustrating the sequence of operation of the counter 68, the HOFF and ODFF flip-flops, the buffer memory **52*a* and the address counter 54. A better understanding of the buffer 30 and terminal unit 28** operation of encoding a reply message into an audible message will be obtained by referring to FIG. 6 in the following discussion.

As pointed out in the preceding section, when the last character of the reply message is written into the buffer memory 52a, a control signal is applied at the output circuits of the gating circuits 64 and 66. The control signal at the output circuit of the gating circuit 64 causes the gating circuit 70 to apply a count signal to the counter 68. It will be recalled that initially, before the reply message was received, the counter 68 was reset into its last state (state twenty). The control signal at the output of the gating circuit 66 causes the address counter 54 to be reset into state zero.

The counter 68 then applies a control signal at the 1 output circuit, causing the gating circuits 72 and 71 to apply a count signal to the counter 68 and the address counter 54 (see FIG. 2) at the following clock pulse. The address counter 54 counts from state zero into state one, and the counter 68 counts into its second state of operation.

At the following clock pulse, the counter 68 applied a control signal at the 1′ output circuit. The gating circuits 74 and 73 apply a control signal at the read input circuit of the read and write control circuit 52c, and the input of the ODFF flip-flop at the following clock pulse. The counter 68 is set into its second state and the ODFF flip-flop is set into a true state.

With the ODFF flip-flop in a true state, a control signal is applied at the input circuit of the control circuit 36c (see FIG. 2). In response to a control signal at its input circuit, the circuit 36c applies a control signal to the motor 36b causing it to rotate the disk 36a. Concurrently, the read and write control circuit 52c causes the buffer memory 52a to read the first character of the reply message out of address one of the buffer memory 52a and causes the character to be stored in the information register 52b. The reply character stored in the information register 52b causes the head selection circuit 40a (see FIG. 2) to couple the output of the reading head 52 which is reading the phonic message component stored in the track corresponding to the character stored in the information register 52b to the speaker 26b of the telephone unit 26. In this manner, the phonic message component stored in the selected track is transduced into an audible message by the speaker 26b of the telephone unit 26.

It should be noted that the ODFF flip-flop is triggered into a true state, thereby causing the disk 36a to start rotating at the same time the character is read out of the memory 52a. However, the operation of the memory 52a is so very much faster than the rotation of the disk 36a that the proper head 52 is selected before any of a message component is read.

After the extended portion 36d of the recording disk 36a is rotated such that the switch 46 is deactuated, the control signal is removed from the output circuit OCRL. At the following clock pulse signal, the inverter circuit 80 and the gating circuit 78 apply a control signal at the input circuit of the HOFF flip-flop triggering it into a true state.

After the recording disk 36a has made a complete revolution, a message component is completely read from the selected track on the recording disk and transduced by the speaker 26b into an audible message as the angular position of the disk 36a returns to its initial position with the beginning of the phonic message components at the read head assembly 40b. The switch 46 is again actuated by the extended portion 36d and a control signal is applied at the OCRL output circuit. The control signal at the OCRL output circuit resets the ODFF and HOFF flip-flops into false states.

At the clock pulse following the time the ODFF flip-flop is reset into a false state, the gating circuits 74, 73 and 70 apply a count control signal to the counter 68 causing it to count into its third state of operation wherein a control signal is applied at the 2 output circuit.

At the following clock pulse after the counter 68 has counted into its third state of operation, the gating circuits 72 and 71 cause the address counter 54 to count into state two. The address counter 54 now addresses the second memory location of the buffer memory 52a. Also, the gating circuits 72 and 70 cause the counter 68 to step into its fourth state of operation wherein a control signal is applied at the 2′ output circuit. The control signal at the 2′ output circuit of the counter 68 causes the gating circuits 74 and 73 to apply a control signal to the input of the ODFF flip-flop and to the read and write control 52c. The ODFF flip-flop is triggered into a true state and applies a control signal at the ODF output circuit and the recording disk 36a again begins to rotate. The character which is read out of the buffer memory 52a and stored in the information regiser 52b is encoded into an audible message component as described for the first character.

When the counter 68 counts into its last state, a complete reply message consisting of ten characters has been encoded into an audible message. Also a control signal is applied at the 10′ output circuit of the counter 68. However, since the 10′ output circuit is not connected to the gate 74, a control signal is not applied at the output circuit of the gating circuit 74 and the encoding operation is terminated.

It should be understood that the control circuits 52d and 52e, shown in FIGS. 3 and 4, are merely one of numerous ways the control circuits may be implemented. The reply messages have been described as containing ten characters. However, more or less than ten characters may be encoded by appropriately changing the number of states of the counters 56 and 68. Also, the reply messages may be made variable in length by providing an end of message character and providing gating to detect the end of message character as described for a Teletype reply message in the above-reference copending patent application entitled, Inquiry System.

What is claimed is:

1. A voice encoding system comprising: recording means containing a plurality of prerecorded phonic message components capable of being read in various sequences and combinations and being transduced into different intelligible phonic messages, memory means for storing a message composed of a plurality of message components, each message component being represented by a group of signals which designates a phonic message component in the recording means, the signal groups being stored in a prearranged order in sequentially addressable memory locations of the memory means which correspond to a series of phonic message components in the recording means phonically descriptive of the stored message, means for counting through a sequence of states identifying memory locations containing the phonic message components of a single message in said prearranged order, means for reading the signal groups out of the memory means identified by the states of the counting means, means for reading the phonic message components out of the recording means designated by the signal groups read out of the memory means, and speaker means for transducing the phonic message components read out of the recording means into a complete audible message for a listener.

2. A voice encoding system comprising a rotatable magnetic recording disk containing a plurality of prerecorded phonic message components capable of being read in different combinations and transduced into different intelligible phonic messages, each phonic message component being recorded in a separate recording track, a reading head for each track aligned for reading the phonic message component from the corresponding track, addressable memory means for storing a message composed of a plurality of message components, each message component being represented by a character which designates a phonic message component on the recording disk, the characters being stored in a prearranged order in sequentially addressable memory locations of the memory means which corresponds to a series of phonic message components on the recording disk phonically descriptive of the stored message, address means for counting through a sequence of states identifying the memory locations containing the phonic message components of a single message in said prearranged order, said memory means being operable for reading characters from the addressed locations thereof, speaker means for transducing the phonic message components read by the recording heads into audible message components for a listener, and electrical circuit means for coupling the phonic message components from the reading heads specified by each character read out of the memory means and thereby cause the speaker means to provide a complete audible intelligible message for a listener corresponding to the stored message.

3. In a digital computer system arranged for receiving intelligible phonic messages from a digital computer the combination comprising: recording means containing a plurality of prerecorded phonic message components capable of being read in various sequences and combinations and being transduced into different intelligible phonic messages, a digital computer for providing a message composed of a series of character signals, each character representing a component of a complete message, memory means for storing the characters of the message provided by the digital computer the characters being stored in a prearranged order in sequentially addressable memory locations of the memory means which correspond to a series of phonic message components in the recording means phonetically descriptive of the message, means for counting through a sequence of states identifying memory locations containing the phonic message components of a single message in said prearranged order, means for reading the characters out of the memory means identified by the states of the counting means, means for reading the phonic message components out of the recording means specified by the characters read out of the memory means, and speaker means for transducing the phonic message components read out of the recording means into a complete audible message for a listener.

4. A voice encoding system comprising: recording means having a plurality of tracks, each track having a prerecorded message component therein, a reading head for each of said tracks, transducing means for converting the message components into audible message components for a listener, memory means comprising a plurality of storage locations each for storing a character of a complete message, each character representing a message component and identifying one of said tracks, said memory means comprising register means for temporarily storing characters being stored into said memory means and for storing characters read out of said memory means for conversion into an audible message, counting means coupled to said memory device for addressing same, control means for causing said counter to count through a plurality of states during both writing and reading in said memory device, and for causing said memory means to store characters contained in said register means into the addressed storage locations thereof during writing operation and for causing characters to be read out of said memory means and stored into said register means, one by one, during a reading operation and head selection means for coupling the transducing means to the one of said heads reading the track specified by a character stored in said register means causing an audible message component to be formed corresponding to that contained in such track.

References Cited by the Examiner

UNITED STATES PATENTS

| | | | |
|---|---|---|---|
| 2,133,268 | 5/1964 | Avakian et al. | 179—1 |
| 3,183,303 | 5/1965 | Clapper | 179—1 |
| 3,209,074 | 9/1965 | French | 179—1 |
| 3,212,059 | 10/1965 | Eldridge | 340—152 X |

KATHLEEN H. CLAFFY, *Primary Examiner.*

R. MURRAY, *Assistant Examiner.*